United States Patent [19]

Ducan

[11] Patent Number: 4,655,616
[45] Date of Patent: Apr. 7, 1987

[54] COMPUTER DIRECT DISC DRIVE WITH MAGNETICALLY STABILIZED SHAFT

[75] Inventor: John E. Ducan, Williamsville, N.Y.

[73] Assignee: Magtrol, Inc., West Seneca, N.Y.

[21] Appl. No.: 779,924

[22] Filed: Sep. 25, 1985

[51] Int. Cl.$^4$ .......................... F16C 25/08; H02K 5/16
[52] U.S. Cl. .................................... 384/446; 384/495; 384/517; 310/90
[58] Field of Search ............... 384/446, 495, 517, 518, 384/519, 535, 581, 563, 611, 612, 620, 192; 310/90, 156

[56] References Cited

U.S. PATENT DOCUMENTS 3,923,352 12/1975 Pentlicki ............................... 384/446

*Primary Examiner*—Stuart S. Levy
*Assistant Examiner*—David Werner
*Attorney, Agent, or Firm*—Joseph P. Gastel

[57] ABSTRACT

A computer direct disc drive wherein a hub is mounted on a shaft supported in spaced bearings within a housing with one of the bearings being fixed and the other bearing having an outer race which is free to float both radially and axially and wherein a biasing spring arrangement and a preload sleeve is positioned around the shaft to bias the outer race of the floating bearing away from the fixed bearing, the improvement which consists mounting magnets within the preload sleeve in axially spaced relationship to each other and in radially spaced relationship to the shaft to set up a magnetic circuit through the shaft, preload sleeve and housing to bias the shaft toward the magnets and force the outer race of the floating bearing into engagement with the housing to thereby stabilize it against radial movement while still permitting it to move axially to compensate for thermal variations to which the direct disc drive is subjected. In another embodiment, disc springs are located between the housing and the outer race, and the magnets are mounted on the housing.

16 Claims, 5 Drawing Figures

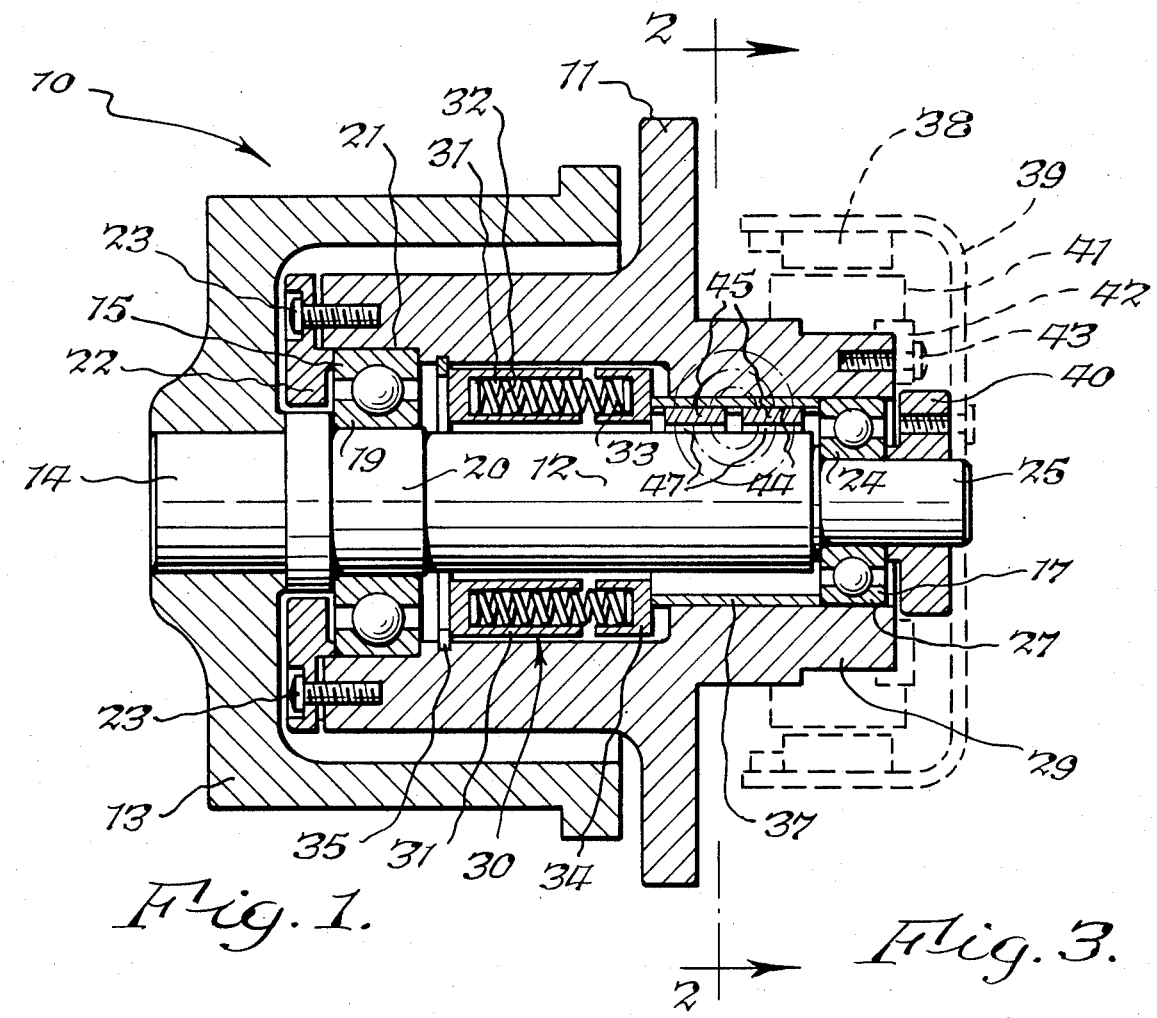
Fig. 1.
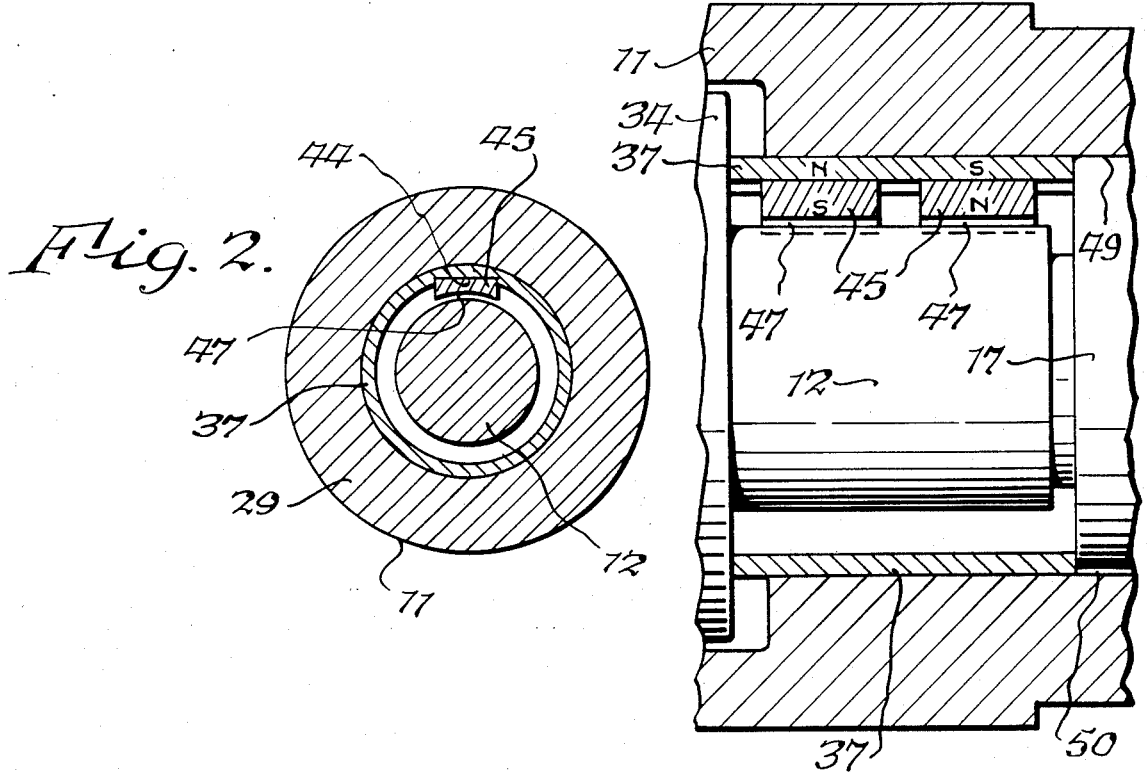
Fig. 2.
Fig. 3.

COMPUTER DIRECT DISC DRIVE WITH MAGNETICALLY STABILIZED SHAFT

BACKGROUND OF THE INVENTION

The present invention relates to a direct disc drive for a computer.

By way of background, in a computer disc drive, a shaft is mounted in a housing by a pair of spaced bearings, one of which is fixed and the other of which is permitted to float axially to allow for thermal variations. In order to permit such floating movement, a clearance is provided between the outer race of the floating bearing and the housing to permit it to move axially. However, this type of mounting also permits the shaft to move radially in the area of the floating bearing which often results in the inability of the read-write head of the computer to find the data in the same radial position and which often results in a loss of data or data becoming hard to read.

The foregoing problem was experienced in direct drive assemblies wherein a direct drive motor was mounted between the housing and shaft. This problem did not exist in older disc drives wherein a motor was offset from the shaft and drove the shaft through a belt and pulley arrangement which produced a side load on the shaft and thus removed the radial free play.

SUMMARY OF THE INVENTION

It is the object of the present invention to provide an improvement in a computer direct disc drive which obviates side play of the shaft in an extremely simple and expedient manner by the use of magnets which are incorporated into the direct disc drive. Other objects and attendant advantages of the present invention will readily be perceived hereafter.

The present invention relates to an improvement in a computer disc direct drive having a hub, a shaft fixedly mounting said hub, a housing, a first bearing having a first outer race fixedly mounted in said housing and a first inner race fixedly mounting said shaft, a second bearing having a second inner race fixedly mounted on said shaft in axially spaced relation to said first inner race and having a second outer race, a first clearance between said second outer race and said housing, spring means effectively positioned between said housing and said shaft for transmitting a biasing force to said second outer race, the improvement for maintaining the axis of rotation of said shaft stable comprising magnet means, means for mounting said magnet means in contiguous spaced relationship to said shaft, a second clearance between said magnet means and said shaft which is greater than said first clearance, said magnet means producing a magnetic circuit with said shaft and said housing to thereby bias said shaft in a radial direction in the area of said second bearing to thereby cause a portion of said second outer race to abut said housing while said shaft does not contact said magnet means to thereby take up play between said shaft and said housing.

The various aspects of the present invention will be more fully understood when the following portions of the specification are read in conjunction with the accompanying drawings wherein:

BRIEF DESCRIPTION OF THE DRAWINGS

FIG. 1 is a cross sectional view of the improved computer disc direct drive construction of the present invention;

FIG. 2 is a cross sectional view taken substantially along line 2—2 of FIG. 1;

FIG. 3 is an enlarged fragmentary cross sectional view similar to FIG. 1 and showing the manner in which the magnetic stabilizing structure of the present invention stabilizes the shaft by pulling it radially;

DESCRIPTION OF THE PREFERRED EMBODIMENT

Figure 4:
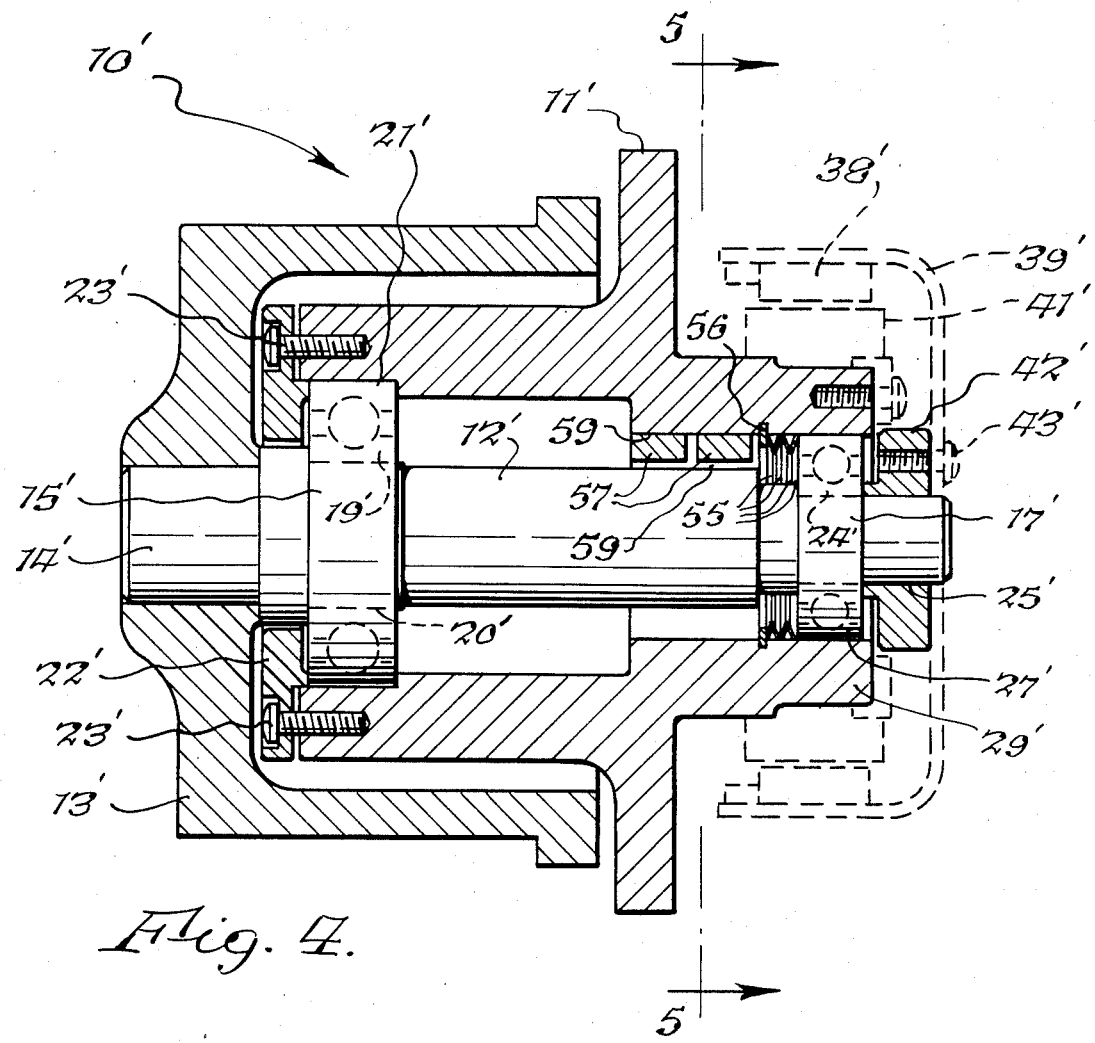
FIG. 4 is a cross sectional view of another embodiment of the present invention.

The computer disc drive 10 includes a housing 11 which mounts shaft 12 for rotation. A hub 13 is fixedly secured on the end 14 of shaft 12 which is mounted in axially spaced bearings 15 and 17. The inner race 19 of bearing 15 is press-fitted onto portion 20 of shaft 12. The outer race 21 of bearing 15 is suitably secured against movement within housing 11 by ring 22 which is attached to housing 11 by a plurality of screws 23. Thus, both the inner and outer races of bearing 15 are fixed against movement. The inner race 24 of bearing 17 is fixedly secured to portion 25 of shaft 12. There is a clearance (not shown) between outer race 27 of bearing 17 and the contigous portion 29 of housing 11. This clearance may be on the order of two to four ten-thousandths of an inch and is necessary to permit relative axial movement between shaft 12 and housing 11 with changes in temperature.

A spring retainer 30 includes an annular retainer housing 31 having a plurality of bores 31 spaced circumferentially therein for receiving first ends of springs 32, the opposite ends 33 of which are received in cavities in annular retainer housing 34. In practice, generally twelve cavities are provided and any desired number of springs 32 may be equally spaced in the cavities to push retainer housings 31 and 34 apart. Housing 31 bears against split ring 35 fixedly secured in housing 11. Housing 34 is free to move axially, and it bears against axially slidable preload sleeve 37 which in turn bears against outer race 27 of bearing 17. Thus, since outer race 27 is pushed to the right, it will also push inner race 24, which is fixedly secured to shaft 12, to the right and this in turn will tend to exert a force moving inner race 19 of bearing 15 to the right, and this force will be transmitted to outer race 21 which is fixed against movement in housing 11.

The bearing structure described above tended to obviate radial play of shaft 12 while permitting relative expansion between it and housing 11 due to changes in temperature. However, the foregoing structure did not eliminate all of the side play of shaft 12. In other words, the axis of rotation was not maintained in a stable condition. As indicated above, when the disc drive was driven by a motor and pulley, the belt which drove the pulley attached to shaft 12 took up the radial play in shaft 12. However, with a direct drive wherein a stator 38 is attached to a frame 39 secured to hub 40 fixedly mounted on shaft portion 25 and wherein a rotor 41 is fixedly secured to housing 11 by a ring 42 and a plurality of screws 43, the biasing force of a belt was not present and shaft 12 was free to float radially. This was deleterious in that the readwrite head was not always able to find the data in the same radial position, and furthermore there were occasions where data also became hard to read or was actually lost.

The foregoing described structure is conventional and the following described structure constitutes the improvement of the present invention. A slot 44 is milled into preload sleeve 37 and a pair of magnets 45 are bonded by suitable adhesive in spaced relationship in slot 44 with their polarities as shown in FIG. 3. Magnets 45 may be of any suitable type, but are preferably rare earth magnets because of their small size. Gaps 47 are provided between the magnets 45 and shaft 12. These gaps are larger than the clearance between outer race 27 of bearing 17 and housing 11. The curvature of the sides of the magnets proximate gaps 47 is cylindrical and of a diameter larger than the diameter of shaft 12 in this area. The magnets 45 will set up a magnetic circuit through the steel shaft 14, the steel preload sleeve 37 and the iron housing 11, as depicted by dot-dash lines in FIG. 1, to pull shaft 12 radially toward them and in so doing cause one side of the outer race 27 of bearing 17 to firmly engage the adjacent portion of housing 11 at 49 (FIG. 3) while causing the clearance 50 to exist at between the diametrically opposite portion of outer race 27 and housing 11. It is to be especially noted that the gaps 47 are not closed when engagement is obtained at 49.

In an actual installation, the magnets 45 exerted a force of between 12 and 14 pounds on shaft 12. However, this force did not at all interfere with axial sliding movement of the outer race 27 of bearing 17 relative to housing 11. The magnetic biasing effected by magnets 45 stabilized shaft 12 to thereby overcome the deficiencies enumerated above which previously existed when the side play of the shaft was present in the prior art direct drive constructions.

Figure 5:
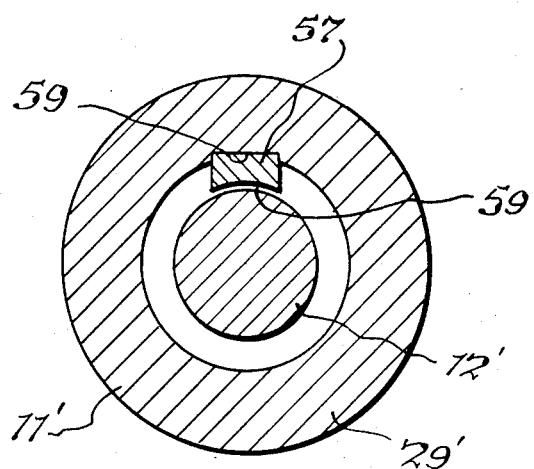
FIG. 5 is a cross sectional view taken substantially along line 5—5 of FIG. 4.

In FIGS. 4 and 5 another embodiment of the present invention is shown. The computer disc drive 10' includes a housing 11' which mounts shaft 12' for rotation. A hub 13' is fixedly secured on the end 14' of shaft 12' which is mounted in axially spaced bearings 15' and 17'. The inner race 19' of bearing 15' is press-fitted onto portion 20' of shaft 12'. The outer race 21' of bearing 15' is suitably secured against movement within housing 11' by ring 22' which is attached to housing 11' by a plurality of screws 23'. Thus, both the inner and outer races of bearing 15' are fixed against movement. The inner race 24' of bearing 17' is fixedly secured to portion 25' of shaft 12'. There is a clearance (not shown) between outer race 27' of bearing 17' and the contiguous portion 29' of housing 11'. This clearance may be on the order of two to four ten-thousandths of an inch and is necessary to permit relative axial movement between shaft 12' and housing 11' with changes in temperature. The foregoing described structure is essentially the same structure which was designated by unprimed numerals in FIGS. 1-3.

There are certain differences between the embodiment of FIG. 4 and the embodiment of FIG. 1. In the embodiment of FIG. 4 a different biasing spring arrangement is used, the preload sleeve has been eliminated, and the magnets are secured directly to the housing. More specifically, in the embodiment of FIG. 4, a plurality of disc springs 55 have their left end bearing against split ring 56 mounted in housing 11 and their right end bearing against outer race 17'. The use of disc springs 55 obviates the need for the spring construction and preload spring of FIG. 1. The disc spring construction is conventional.

In the embodiment of FIGS. 4 and 5 magnets 57 are installed in slot 59 of housing portion 29' and in spaced relationship to each other. Preferably magnets 57 are adhesively bonded to housing portion 29', but they may be secured in any other manner. The orientation of magnets 57 relative to each other is the same as shown in FIG. 3 for magnets 47. In other words, one magnet has its north pole in contiguous relationship to shaft 12 and the other magnet has its south pole in contiguous relationship to shaft 12'. Therefore, a magnetic circuit is set up through magnets 57, housing 11' and shaft 12', and this magnetic circuit biases shaft 12' upwardly in FIG. 4. As with the embodiment of FIG. 3, the clearance 59 between magnets 57 and shaft 12' is greater than the clearance between outer race 17' and housing portion 29'. Therefore, the outer race 17' will bear against housing portion 29' while there still will be a clearance 59.

In both embodiments, the force of the magnets should remain substantially constant with speed; there should be no torque loss; and there should be no significant eddy currents. It will be appreciated, however, that other magnet embodiments can also be used, except that they will not provide the optimum results of the above-described embodiments. Such alternate embodiments may include the use of a single magnet and a spaced piece of iron, and a pair of magnets spaced circumferentially, rather than axially, as shown. It will also be appreciated that any type of magnets, including rare earth magnets, may be used provided that they provide a sufficient driving force through the circuit and a reasonable flux level.

While preferred embodiments of the present invention has been disclosed, it will be appreciated that the present invention is not limited thereto but may be otherwise embodied within the scope of the following claims.

What is claimed is:

1. In a computer disc direct drive having a hub, a shaft fixedly mounting said hub, a housing, a first bearing having a first outer race fixedly mounted in said housing and a first inner race fixedly mounting said shaft, a second bearing having a second inner race fixedly mounted on said shaft in axially spaced relation to said first inner race and having a second outer race, a first clearance between said second outer race and said housing, spring means effectively positioned between said housing and said shaft for transmitting a biasing force to said second outer race, the improvement for maintaining the axis of rotation of said shaft stable comprising magnet means, means for fixedly mounting said magnet means relative to said housing in contiguous space relationship to said shaft, a second clearance between said magnet means and said shaft which is greater than said first clearance, said magnet means producing a magnetic circuit with said shaft and said housing to thereby bias said shaft in a radial direction in the area of said second bearing to thereby cause a portion of said second outer race to abut said housing while said shaft does not contact said magnet means to thereby take up play between said shaft and said housing.

2. In a computer disc direct drive as set forth in claim 1 wherein said computer direct disc drive includes first and second axially spaced bores in said housing between said first and second bearings, and wherein said spring means are in said first bore, and a preload sleeve mounted for axial movement in said second bore for transmitting a biasing force from said spring means to said second outer race, the improvement wherein said magnet means are mounted on said preload sleeve.

3. In a computer disc direct drive as set forth in claim 2 wherein said magnet means comprises first and second magnets mounted in spaced relationship to each other.

4. In a computer disc direct drive as set forth in claim 3 wherein said first and second magnets are located in side-by-side relationship within said preload sleeve.

5. In a computer disc direct drive as set forth in claim 4 wherein said magnets are each oriented in opposite directions with opposite poles of each of said magnets being located in contiguous relationship to said shaft.

6. In a computer disc direct drive as set forth in claim 3 including a slot extending longitudinally within said preload sleeve, said first and second magnets being mounted in said slot.

7. In a computer disc direct drive as set forth in claim 6 wherein said first and second magnets have cylindrically curved surfaces of larger diameter than contiguous portions of said shaft.

8. In a computer disc direct drive as set forth in claim 7 wherein said slot has a planar surface, and wherein said first and second magnets have planar surfaces which are located in contiguous relationship to said planar surface of said slot.

9. In a computer disc direct drive as set forth in claim 8 including bonding means between said planar surface of said preload sleeve and said planar surfaces of said first and second magnets.

10. In a computer disc direct drive as set forth in claim 1 wherein said magnet means are mounted on said housing.

11. In a computer disc direct drive as set forth in claim 1 wherein said spring means comprise disc springs, and wherein said magnet means are mounted on said housing.

12. In a computer disc direct drive as set forth in claim 10 including an axially extending slot in said housing, and wherein said magnet means comprise first and second magnets mounted in axially spaced relationship in said slot.

13. In a computer disc direct drive as set forth in claim 1 wherein said magnet means comprises first and second magnets mounted in spaced relationship to each other.

14. In a computer disc direct drive as set forth in claim 13 wherein said magnets are each oriented in opposite directions with opposite poles of each of said magnets being located in contiguous relationship to said shaft.

15. In a computer disc direct drive as set forth in claim 14 wherein said first and second magnets have cylindrically curved surfaces of larger diameter then contiguous portions of said shaft.

16. In a computer disc direct drive as set forth in claim 15 including an axially extending slot in said housing, a planar surface in said slot, and wherein said first and second magnets have planar surfaces which are located in contiguous relationship to said planar surface of said slot.

* * * * *